Sept. 9, 1958     O. J. POUPITCH     2,850,936
PULL TYPE SHEET METAL FASTENER
Filed Sept. 20, 1955     2 Sheets-Sheet 1
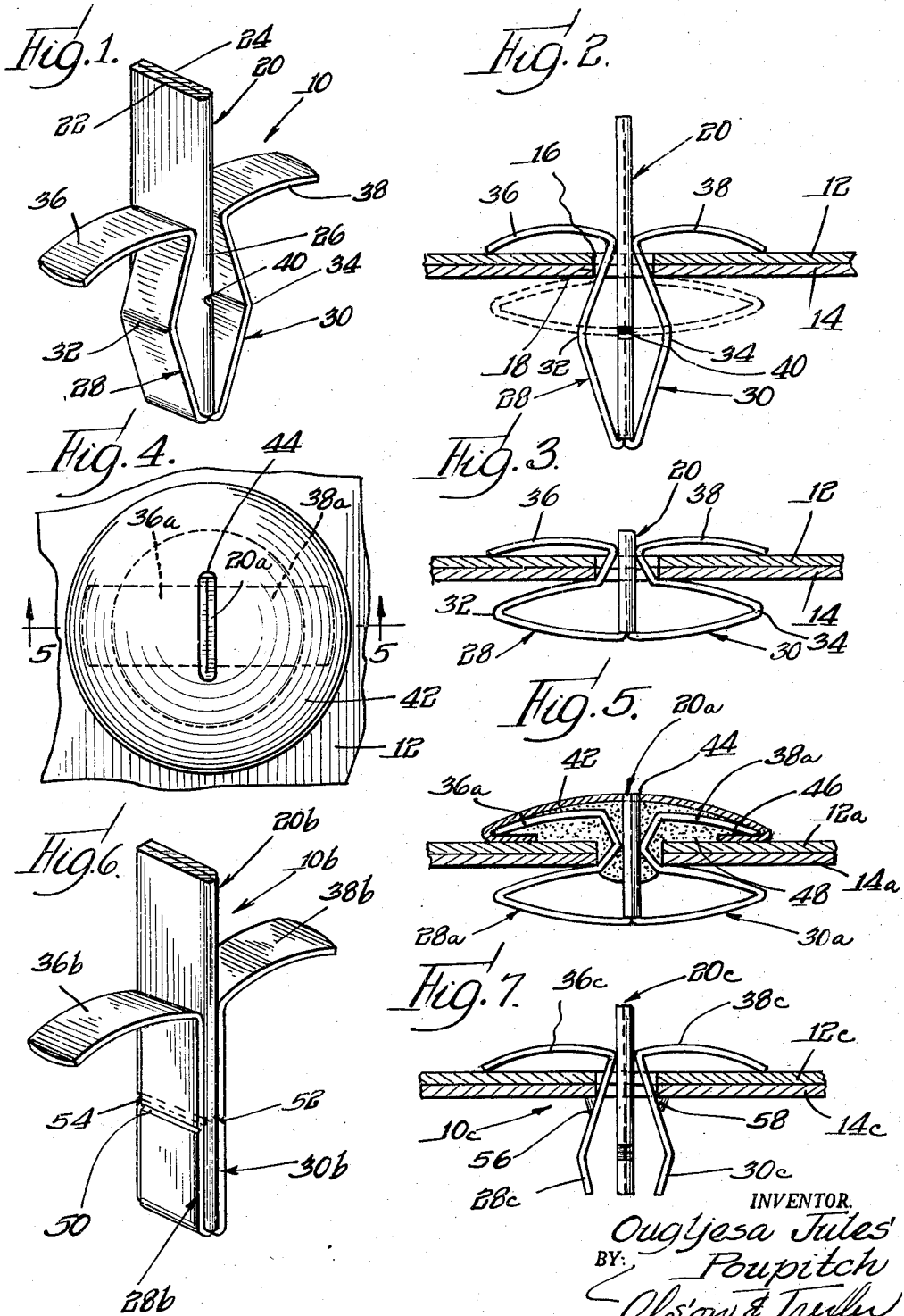
INVENTOR.
Ougljesa Jules Poupitch
BY Olson & Trexler

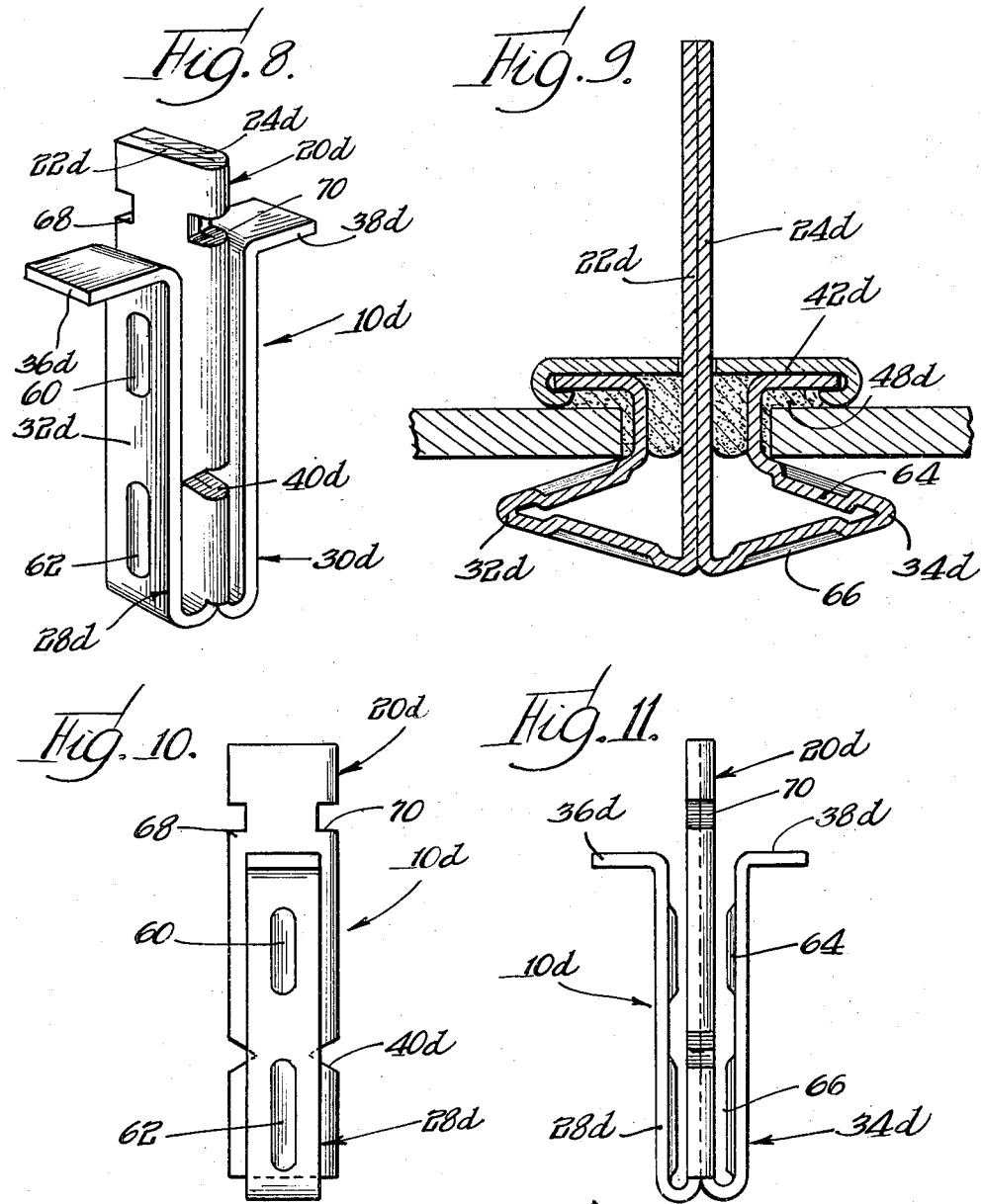

United States Patent Office 2,850,936
Patented Sept. 9, 1958

2,850,936
PULL TYPE SHEET METAL FASTENER

Ougljesa Jules Poupitch, Itasca, Ill., assignor to Illinois Tool Works, Chicago, Ill., a corporation of Illinois Application September 20, 1955, Serial No. 535,422

3 Claims. (Cl. 85—37)

The present invention relates to a novel fastening device, and more particularly to a novel fastening device adapted to be applied to an apertured work structure.

An object of the present invention is to provide a novel sheet material fastener which may be easily inserted through an aperture in a work structure and which may be drawn into tight clamping engagement with opposite sides of the work structure without the aid of complementary fastening devices such as nut members or the like.

Another object of the present invention is to provide a novel fastener assembly having characteristics of the above described type, which fastener assembly also is capable of effectively sealing the aperture through the work structure against the passage of moisture, dust and the like.

Still another object of the present invention is to provide a novel one-piece sheet material fastening device of the above described type which is of economical construction and which may be produced by utilizing simple stamping and bending operations.

Other objects and advantages of the present invention will become apparent from the following description and the accompanying drawings wherein:

Fig. 1 is a perspective view showing a fastener member embodying the principles of this invention;

Fig. 2 is a partial sectional view showing the fastener member of this invention applied to an apertured work structure;

Fig. 3 is a view similar to Fig. 2 but showing the fastener member deformed for clampingly engaging opposite sides of the work structure;

Fig. 4 is a plan view of a modified form of the present invention;

Fig. 5 is a sectional view taken along line 5—5 in Fig. 4;

Fig. 6 is a perspective view showing a fastener member embodying a modified form of the present invention;

Fig. 7 is a partial sectional view showing a further slightly modified form of the present invention;

Fig. 8 is a perspective view showing another modified form of the present invention;

Fig. 9 is a sectional view showing a device of the type illustrated in Fig. 8 applied to a workpiece and also showing a separate head member and a quantity of sealing material assembled with the device;

Fig. 10 is a side elevational view of the device shown in Fig. 8; and

Fig. 11 is another side elevational view of the device shown in Fig. 8.

Referring now more specifically to the drawings wherein like parts are designated by the same numerals throughout the various figures, a fastener 10 embodying one form of the present invention is shown in Figs. 1, 2 and 3. The fastener 10 is formed from a single piece of resilient sheet material such as sheet metal. The fastener is adapted to be applied to an apertured work structure and may be used, for example, to connect a pair of panels 12 and 14 having apertures 16 and 18 therethrough as shown in Figs. 2 and 3.

The fastener 10 is formed from an elongated strip of sheet material which is folded to provide a stem 20 having abutting sections 22 and 24 integrally joined by a bight portion 26. Integrally joined to ends of the sections 22 and 24 are fastener stud portions 28 and 30 respectively which are reversely bent so that they extend upwardly along the sections 22 and 24. In this embodiment, the stud portions are flared outwardly from the entering end of the stem and then converged from bend lines 32 and 34 respectively to facilitate application of the fastener to a work structure in the manner described below. Curved sections 36 and 38 extend laterally outwardly from the free upper ends of the portions 28 and 30 for providing the fastener with head means engageable with one side of the work structure.

The fastener 10 is applied to an apertured work structure by inserting the stud portions through the aperture as shown in Fig. 2. It will be appreciated that the diverging entering end sections of the stud portions serve to cam the stud portions inwardly to permit passage thereof through the aperture and that the upper converging sections of the stud portions serve to engage behind the work structure and initially retain the fastener in assembled relationship with the work structure. After the fastener has been initially assembled as shown in solid lines in Fig. 2, the stem 20 is pulled axially outwardly by means of a suitable tool, not shown, which tool also simultaneously presses against the head sections 36 and 38 so that the stud portions are collapsed and drawn tightly against the work structure as shown in Fig. 3 and as shown in broken lines in Fig. 2. It will be appreciated that this action also causes the head sections to be drawn tightly against the outer surface of the work structure so that the work structure is tightly clamped between the head and stud portions of the fastener. Since the stud portions are initially partially folded or collapsed by being bent along the lines 32 and 34, they may be relatively easily drawn against the work structure in the manner just described, as will be understood. After the fastener is fully applied to the work structure as shown in Fig. 3, the outer projecting end of the stem 20 is preferably broken or cut away so that the remaining portion of the stem will be substantially flush with the fastener head sections, and notches 40 are formed in opposite edges of the stem to facilitate proper removal of the outer stem portion.

Figs. 4 and 5 show a slightly modified form of the present invention wherein a sheet material fastener which is identical to the above described fastener is utilized as indicated by the application of identical reference numerals with the suffix "a" added to corresponding elements. In this embodiment, a circular sheet material cap 42 is carried by the fastener head sections, which cap is provided with a central slot 44 through which the stem 20a extends. The cap not only improves the external appearance of the fastener but also provides an inturned annular flange 46 for retaining a washer 48 formed from any suitable sealing material. The fastener unit of Figs. 4 and 5 is applied to a work structure in the same manner as the fastener described above, and when the head sections are drawn toward the work structure, they and the cap member compress and deform the relatively soft sealing washer into and around the work structure aperture so that the aperture is sealed.

Fig. 6 shows a fastener 10b which is similar to the above described fasteners as indicated by the application of identical reference numerals with the suffix "b" added to corresponding elements. This embodiment differs in that the stud portions 28b and 30b are formed in the manner shown so that they are initially substantially straight or parallel to the stem. In order to facilitate collapsing of the stud portions 28b and 30b into clamping engagement with the work structure, the portions are respectively scored as indicated at 50 and 52. In this embodiment, the stem portion is also scored as at 54 so that it may be easily broken away after the fastener has been applied to the work structure. It will be appreciated that the fastener described above may also be scored in a manner similar to the fastener 20b, and that the fastener 10b may be used in combination with a cap member and sealing washer of the type shown in Figs. 4 and 5.

Fig. 7 shows another modified form of the present invention which is similar to the above described structures as indicated by the application of identical reference numerals with the suffix "c" added to corresponding elements. In this embodiment, lugs or protuberances 56 and 58 are struck from the stud portions 28c and 30c for engaging the inner surface of the work structure and positively preventing the stud portions from being withdrawn through the aperture while they are being collapsed into clamping engagement with the work structure. Preferably, the protuberances 56 and 58 are spaced axially from the head sections 36c and 38c a distance so that the arcuate head sections must be compressed or flexed in order to permit the stud portions to advance through the work structure aperture sufficiently to position the protuberances behind the work structure. While the stud portions 28c and 30c have been shown as including outwardly flaring and converging sections, it is understood that they may be formed parallel to the stem as are the stud portions shown in Fig. 6. It is also understood that the stud portions and stem of the fastener shown in Fig. 7 may be scored in the manner shown in Fig. 6, and that the fastener 10c may be assembled with a cap and sealing washer such as those shown in Figs. 4 and 5.

In Figs. 8 through 11 there is shown another embodiment of the present invention which is similar to the above described structures as indicated by the application of identical reference numerals with the suffix "d" added to corresponding elements. In this embodiment the stud section 28d is provided with inwardly formed ribs 60 and 62 at opposite sides of its central section 32d, and the stud member 30d is provided with similarly located and formed ribs 64 and 66. The ribs serve to strengthen and rigidify the opposite end portions of the stud members 28d and 30d to insure bending of the stud members along the sections 32d and 34d as shown in Fig. 9 when the device is applied to a workpiece. If desired, a head member 42d may be applied to the head sections of the device 10d and a mass 48d of sealing material may be inserted beneath the head member, but it is understood that the member 10d may be used without the head member 42d and the sealing material for certain applications.

The stem 20d is provided with a pair of notches 68 and 70 adjacent its upper end. These notches facilitate gripping of the stem with a tool, not shown, so that the stem may be easily pulled upwardly to collapse the stud sections and secure the fastening device to the work. While the head sections 36d and 38d of the device 10d have been shown in a substantially flat condition, it will be appreciated that these head sections may be curved similarly to the head sections described. It will also be appreciated that the stud sections 28d and 30d may be preformed in the manner shown in Fig. 1 or scored as shown in Fig. 6 if desired further to facilitate application of the device to the work.

From the above description it is seen that the present invention has provided a novel one-piece sheet material fastener which may be easily applied to an apertured work structure and deformed to clampingly engage the work structure. It is also seen that the present invention has provided a novel fastener unit which is capable of effectively sealing an aperture through the work structure.

While the preferred embodiments of the present invention have been shown and described herein, it is obvious that many structural details may be changed without departing from the sipirt and scope of the appended claims.

The invention is claimed as follows:

1. A pull type fastener made from a blank of sheet material originally substantially rectangular and having a slit formed longitudinally and substantially medially thereof for a substantial portion of its length, and having a fold in line with said slit and extending the full remaining longitudinal extent of said blank forming abutting shank portions, the double thickness of material interconnected marginally along said fold forming a substantially rigid pull stud section, the shank portions on either side of the slit having portions reversely bent back upon said pull stud section susbtantially at the end of said fold to provide a rounded entering nose portion traversing the width of said shank portions and further bent to provide at their free terminal ends outwardly extending flanges to serve as head means to engage a workpiece, the reversely bent back portion of each shank portion comprising means rendering the intermediate section of each reversely bent back portion between the nose portion and the flanges less resistant to lateral bending than the major portions of the lengths of the shank portions on opposite sides of said intermediate section, said pull stud section extending longitudinally beyond said flanges in a direction away from said nose portion to provide a tool engaging means whereby application of force in a direction of the protruding portion of the pull stud section will cause the reversely bent shank portions to be distorted laterally outwardly at said intermediate sections and upwardly to provide shoulders for cooperation with said flanges to clampingly engage a complementary workpiece therebetween, and notch means on said pull stud section intermediate the nose portion of the fastener and the tool engaging means for facilitating breaking of the stud section in the vicinity of said notch means after the mounted fastener has been fully applied to a work structure.

2. A one-piece sheet material fastener, as defined in claim 1, wherein each of said reversely bent shank portions between said nose portion and said flange includes axially spaced and axially extending rigidifying rib means at opposite sides of said intermediate section for insuring bending of the shank portions along said intermediate sections.

3. A one-piece sheet material fastener, as defined in claim 1, wherein said pull stud section is provided with notch means on that portion of said stud section extending longitudinally beyond said head means for facilitating connection of the stud section with a tool utilized by an operator for pulling the stud section axially outwardly during application of a fastener to a work structure.

References Cited in the file of this patent

UNITED STATES PATENTS

| | | |
|---|---|---|
| 964,226 | Farrand | July 12, 1910 |
| 1,872,014 | Schjolin | Aug. 16, 1932 |
| 2,017,421 | Post | Oct. 15, 1935 |
| 2,098,556 | Tamada | Nov. 9, 1937 |
| 2,100,017 | Van Uum | Nov. 23, 1937 |
| 2,255,650 | Burke | Sept. 9, 1941 |
| 2,408,340 | Poupitch | Sept. 24, 1946 |
| 2,498,627 | Hallock | Feb. 21, 1950 |
| 2,527,307 | Huck | Oct. 24, 1950 |
| 2,597,344 | Lang | May 20, 1952 |